July 27, 1948.  S. C. HURLEY, JR  2,446,046
SIZING BRIDGE
Filed Sept. 23, 1944
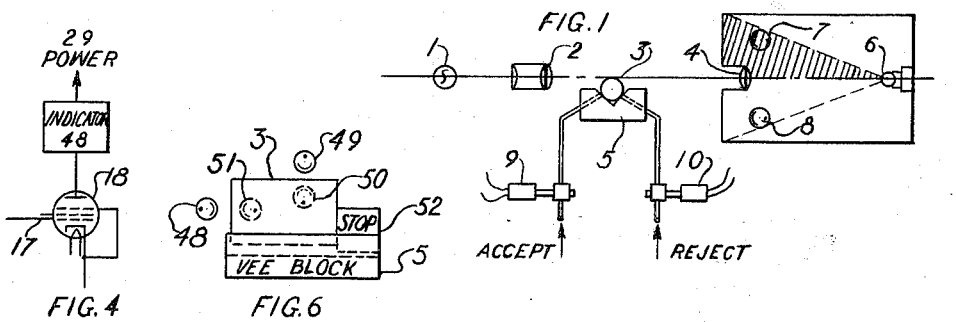
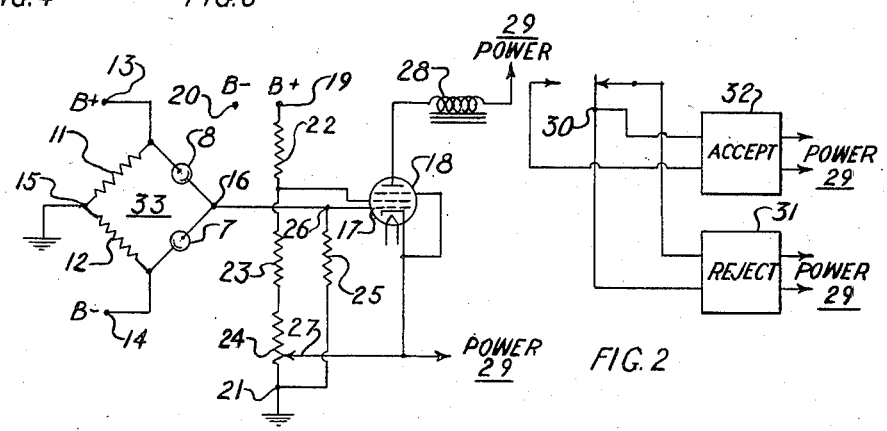
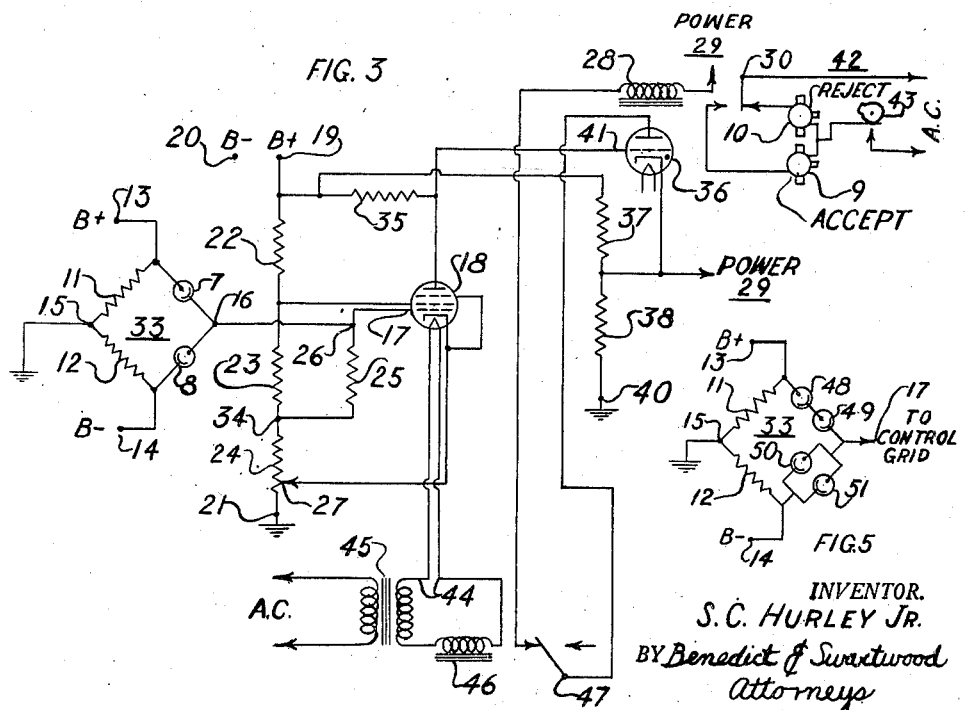
INVENTOR.
S. C. HURLEY JR.
BY Benedict & Swartwood
Attorneys Patented July 27, 1948

2,446,046

UNITED STATES PATENT OFFICE 2,446,046

SIZING BRIDGE

Samuel C. Hurley, Jr., Danville, Ill.

Application September 23, 1944, Serial No. 555,474

5 Claims. (Cl. 250—41.5)

This invention relates to the improved method and apparatus for photoelectric inspection of articles of manufacture and particularly to a method and apparatus for making precision dimensional measurements.

This application is a continuation in part of my copending application for 480,025, filed March 22, 1943, now abandoned, which, in turn, is a continuation in part of my abandoned application 473,187, filed January 22, 1943.

It particularly relates to a method and apparatus for using a bridge circuit for selecting or rejecting articles of manufacture in accordance to the predetermined dimension of the article, and specifically to a device and method wherein the selecting or rejecting mechanism can be made to function sharply at each extremity of the adjustable tolerance range.

My invention embodies a novel method and apparatus in which a bridge circuit containing light sensitive devices for making a photoelectric inspection wherein the results of this inspection may be quickly, accurately and readily obtained. The bridge circuit is connected in a manner that the desired inspection is only indicated for one state of unbalance of the bridge circuit, and any other state of unbalance or a balanced state will indicate the undesired inspection.

My invention is useful in the sizing of articles, wherever rapid precision photoelectrical inspections are desired. It is particularly useful in determining whether an article is of a predetermined size although it may be used in determining and sorting articles of different sizes.

It is also useful in connection with photoelectric inspections wherein all mechanical stops and reference points are replaced by photoelectric means wherein each control grid, controlling the flow of current through an electronic circuit, is controlled by my bridge circuit.

It is one object of my invention to provide a novel bridge circuit which will actuate an energy translation means used in interpreting the result of the inspection, wherein the translation means is only actuated when the bridge is unbalanced in one direction of potential and is not actuated when the bridge is balanced or when the bridge is unbalanced in the other direction of potential.

It is another object of my invention to provide a single amplifying stage in connection with the bridge circuit wherein the energy translation means is actuated only when the bridge is unbalanced in a positive direction of potential.

It is also an object of my invention to provide a two stage amplifying system in connection with my bridge circuit, which is particularly useful in photoelectrical camming, wherein the energy translation means is actuated only when the bridge is unbalanced in a negative direction of potential.

It is a further object of my invention to provide a plurality of phototubes connected in each side of the bridge wherein the tubes are connected in series in one side of the bridge and in parallel in the other side of the bridge. This type of bridge circuit being particularly useful in connection with making two or more dimensional inspections of the article although it has many other applications.

Another object of my invention is to provide in combination with my bridge circuit, a novel optical system in which the maximum and minimum tolerance may be independently varied by independently changing the position of the light sensitive device used in the photoelectric inspection about a magnifying mirror positioned to receive light passing through the inspection zone.

It is also an object of my invention to provide a selecting mechanism for accepting and rejecting an article which normally is connected in such a manner that it will reject the article and the article will be accepted only by positive action of my circuit. This prevents the operation of the accepting mechanism in case a portion of the circuit should fail, e. g., one of the amplifying tubes burn out. This is highly important in precision dimensional measurement, wherein it is essential to prevent a bad specimen from being passed along with a good specimen. It would minimize the advantages of my device if the selecting mechanism were arranged to normally accept the article and only reject the article if some positive action occurred. In this case, if any part of the system failed it might pass a number of bad pieces along with the good pieces before the failure could be discovered. This is particularly harmful when the apparatus is used to inspect articles and equipment, for use in connection with machines inherently dangerous such as automobiles, aeroplanes, many types of industrial equipment, machines and ammunition for war where it is of the utmost importance that all the articles, specimens, parts, etc., that are accepted by the inspection device be used with confidence and that they meet the careful considered predetermined requirements. It is vital that all of the inspected articles are good because the use of a single bad piece might result in severe property damage, if not the loss of life. It is particularly important in testing materials for war, in which my invention is particularly useful, that all the articles accepted meet the test.

Bridge circuits have been used in connection with amplifiers responsive to the amount of light received by the light sensitive devices, the amplifier used only to measure the amount of current flowing across the bridge.

Bridge circuits have been used in certain types of photoelectric inspections particularly for matching colors, comparison of reflected light, determination of light intensities, etc., but have been used wherein the bridge is in balance to indicate the desired result of the inspection. But bridge circuits of any kind have not been used in precision dimensional inspections. The bridge circuits heretofore used would not be suitable for rapidly and accurately making precision dimensional inspections. I accomplish this by using a bridge in which the desired results of the inspection are indicated only when the bridge is unbalanced in one direction of potential and are not indicated when the bridge is in balance or when the bridge is unbalanced in the direction of potential opposite to the direction of unbalance for indicating the desired results of the inspection. Using a balanced condition of the bridge to accept the article would not be operative in precision dimensional inspections and using the bridge circuit to actuate the reject mechanisms would not be suitable. In my device, it would also be undesirable to use the amplifier to measure the amount of current flowing across the bridge and, on the contrary, I provide a novel bridge circuit and optical system wherein the difference between a bad piece and a good piece within the tolerance range is sharply defined in order to prevent inaccuracies. Gradations from good to bad cannot be used but all of these objectives can be obtained by using the principles of my device. The current flowing through the amplifying tube preferably goes from a maximum to a minimum or from a minimum to a maximum depending on conditions of light and shadow on the light sensitive devices.

Photoelectric circuits independently operated have been used to make dimensional inspections but are not suitable for use in high precision, rapid, dimensional measurements for which my device and apparatus is particularly suited, since the previous devices used complicated relay systems for obtaining a co-action between the circuits and for actuating the final selecting means. Mechanical switches and relay switches are undesirable since they lag behind the photoelectric inspection and minimize the advantages obtained by photoelectric inspection. By my device, I am able to make several hundred inspections per minute which would be impossible to make with complicated relay systems.

In general, my device comprises means for projecting a beam of light through an inspection zone, means for positioning the article to be inspected in the inspection zone, and means for determining the inspection desired when the bridge is unbalanced in one direction of potential only, and means for determining that the article did not meet the required test by determining any other condition of the bridge.

In a more specific embodiment, I provide an energy translation means which may actuate a selecting mechanism and which is controlled by a single amplification stage, said amplifying stage responsive only when the bridge is unbalanced in a positive direction which means that in sizing operations, the light sensitive devices which must be placed in light for the piece to be good are located in the positive arm of the bridge and the light sensitive device which must be placed in shadow for the piece to be good are located in the negative arm of said bridge.

In another specific embodiment of my invention, I employ a two-stage amplification system for actuating the energy translation means wherein the first stage of amplification is controlled such as to actuate the energy translation means only when the bridge is unbalanced in a negative direction which means that the light sensitive device or devices which must be in light when the desired inspection is obtained are located in the negative arm of the bridge and the light sensitive device or devices which must be in shadow when the desired inspection is obtained are located in the positive arm of the bridge. The first stage of amplification is actuated and the second stage is not actuated when the desired inspection is obtained. To prevent the operation of the selecting mechanism for accepting the said article in case the first stage amplifier burns out, I provide a means for preventing the operation of the second stage which would otherwise be actuated.

In another specific embodiment of my invention, I provide a means for simultaneously making two or more inspections of the article, in which case I connect all the light sensitive devices which must be in light for a good piece, in series in one arm of the bridge and those which must be in shadow for a good piece in parallel in the other arm of the bridge, in which arm of the bridge I place the phototubes connected in a series and those connected parallel depending upon whether I use one or two stage amplification. By this novel means, all the tubes which must be in light for good pieces are connected in series so that if any one of those are in shadow, it will unbalance the bridge in the wrong direction of potential for accepting the article.

In another embodiment of my invention, I employ my bridge circuit in combination with a novel optical system wherein the maximum tolerance may be independently adjusted by independently varying the position of the light sensitive devices in the optical system.

Further objects, uses and advantages of my invention will become apparent by referring to the drawing in which Figure 1 illustrates the optical system which may be used in connection with my bridge circuit and an illustration of the physical means for accepting and rejecting the article.

Figure 2 shows one embodiment of my bridge circuit in which I employ one stage amplification.

Figure 3 shows another embodiment of my bridge circuit wherein I use two stage amplification.

Figure 4 illustrates diagrammatically the use of an indicator in the anode circuit of the amplifying tube of the one stage amplifier shown in Figure 2 or in the anode circuit in the amplifier in the second stage shown in Figure 3.

Figure 5 shows one arrangement for use of a plurality of phototubes for making more than one inspection.

Figure 6 shows specifically one application of the bridge circuit shown in Figure 5 by which both the diameter and length of an article may be determined.

Throughout the description of the drawings, the same numbers will be used for comparable parts in order to make the drawings easier to follow.

Referring to Figure 1, 1 indicates a source of light which may be an incandescent bulb for providing a concentrated source of light although any other suitable source may be used. Condensing lens assembly 2 is positioned adjacent bulb 1 to direct a concentrated light upon the specimen 3 to be tested, said bulb being preferably, but not necessarily on the optical axis of lenses 2. A projection lens 4 is preferably positioned to have its optical axis in alignment with the optical axis of the condensing lens 2 and is positioned upon the opposite side of the specimen 3 from the condensing lens to receive light passing through the inspection zone and passing specimen 3.

My invention has many uses in rapid, precision measurements, and I will illustrate my invention in connection with the sizing of articles or specimens. My invention is adapted to be employed for the selecting or rejecting of articles of manufacture on the basis of size or dimension and in order to accomplish this end, the articles of manufacture or specimen are preferably positioned in the light beam between the condensing lens 2 and the projection lens 4 so as to intercept a portion of the light beam. The V block 5 or other suitable means is used for orienting the specimen in the photoelectric inspection zone. For convenience, the specimen is illustrated as a cylindrical element, the diameter of which is the critical dimension which forms a basis for selection or rejection.

The V block or other support 5 is preferably but not necessarily positioned with respect to the optical axis of the complete system so that a perfect specimen has its upper extremity slightly above the said optical axis. It is apparent that a specimen larger or smaller in diameter than a perfect specimen intercepts a greater or lesser amount of light passing through the inspection zone to the projection lens 4, spaced from the condensing lens 2 and preferably disposed with its optical axis substantially coincident to the optical axis of lens 2. On the optical axes of the lenses described, is the magnifying mirror 6 shown as a cylinder but other types of magnifying mirrors may be used, such as a spherical or cylindrical segment, concavo-convex, concave, etc. A pair of light sensitive devices 7 and 8 are positioned adjacent the projection lens 4, one on each side of the optical axis of the lens system. Although I have shown the light sensitive devices 7 and 8 as phototubes, any light sensitive device including photocells and the like may be used.

The preferred arrangement is such that the specimen 3 to be tested and the mirror 6 are positioned at the conjugate foci of the projection lens so that a sharply defined shadow of the upper edge of specimen 3 is projected upon the surface of the mirror 6. Depending upon the interception of light by the specimen, both may be in light or one may be in shadow and the other in light so that a very small displacement of the shadow on the mirror causes a change from one of these conditions to the other. It can readily be seen that the spacing of the tubes 7 and 8 from the optical axis of the lens system determines the extreme ranges of the diameter of the specimen, that is these distances are employed to designate the tolerance of a substantially perfect specimen with respect to a perfect specimen. It can also be seen that if the diameter of the specimen exceeds the upper limit of tolerance, both tubes 7 and 8 will be in shadow. Likewise, if the diameter of the specimen is below the limit of tolerance both tubes will be in light. However, when tube 7 is in shadow and tube 8 is in light, an acceptable specimen is indicated.

The minimum tolerance can be adjusted by moving tubes 7 along a line transverse to the optical axis. If a closer tolerance for the minimum size is desired, tube 7 is moved toward the optical axis. If a greater tolerance for a minimum size is desired, tube 7 is moved away from the optical axis. In the same manner, the tolerance for the maximum size may be varied by moving tube 8 with respect to the optical axis or in respect to the magnifying mirror.

Substantially any degree of magnification may be obtained by moving the mirror 6 toward or away from the tubes 7 and 8 while at the same time adjusting the position of the projection lens 4 to maintain the system in focus; alternatively, the tubes 7 and 8 may be moved toward or away from the mirror 6. Likewise, substantially any tolerance may be established by the proper spacing of the tubes 7 and 8 from each other or from the optical axis of the lens system and a sharp cut-off may be obtained at the extremities of the range.

Still referring to Figure 1, a means is shown for removing the article from the inspection zone at the end of the inspection in accordance with whether the specimen should be accepted or rejected. For this purpose solenoid valves 9 and 10 are provided to control jets of high-pressure gas, preferably air, to remove a specimen from the testing zone at the end of the inspection. Valve 9 is actuated when the specimen should be accepted as when tube 7 is in shadow and tube 8 is in light. Valve 10 rejects the specimen when tubes 7 and 8 are both in light or both in shadow. If tube 8 is in shadow and tube 7 is in light means are provided for preventing acceptance of the specimen.

Figure 2 illustrates the use of my bridge circuit in connection with the apparatus shown in Figure 1. Phototubes 7 and 8 and resistors 11 and 12 form the four arms of a bridge connected across a source of direct current having its positive terminal at 13 and its negative terminal at 14. The bridge is grounded at 15. In Figure 2, I have illustrated only one stage amplification. It is necessary in order to accomplish the objects of my invention to have tube 8, the tube which is in light when the specimen is good, connected in the positive arm of the bridge as shown. Tube 7 which is in shadow when the specimen is good, is connected in the negative side of the bridge in order that only one direction of potential may actuate the energy translation means as will be hereinafter described. The midpoint 16 of the bridge is connected to the control grid 17 of the electronic tube 18 in order to control the flow of current through the amplifier 18. The tube 18 may be any suitable amplifying tube and may be either of the vacuum type or the arc discharge gas-filled type although I have shown an amplifying tube of the pentode type. The operating voltage for the electronic tube 18 is provided by a source of D. C. potential having its positive terminal connected at 19 and its negative terminal at 20 and grounded at 21. The operating voltage for the tube 18 is further provided by the dividing resistors 22, 23, 24. A connection is provided across a bridge through the resistor 25 conected to the control grid 17 at point 26 and to the ground 21. The cathode circuit of tube 18 is connected by means of a slidable contactor 27 to the resistor 24 in order that the bias on the tube may be properly adjusted. A suitable energy translation means 28 shown as a relay coil is positioned in the anode circuit of the tube 18 and is energized or actuated only when current flows through tube 18 and is preferably arranged so that it is only actuated when a maximum current flows through 18 in order to provide the sensitivity required for precision photoelectric inspections of this type.

Element 28 is shown as a conventional relay coil, although other types of energy translation means may be used. After the tube 18 is placed in condition for conducting a current, current flows through the tube by means of the power source 29 although as previously described, the operating voltages may be provided by the source of D. C. potential having its positive terminal at 19. The relay coil 28 is in position to actuate a relay switch 30 which is shown in the open position thereby closing the reject circuit 31 connected to the power source 29. When current flows through the tube 18, the energy translation device 28 or relay coil is energized which actuates relay switch 30 and closes the circuit 32 used for accepting the article which is also connected to a conventional power source 29.

It should be noted that, according to the principles of my invention, the reject circuit is normally closed and the accept circuit cannot be closed until some positive operating action occurs which insures that no bad specimen will mix with the good specimens which is vital in precision dimensional inspections wherein the specimen may be used in connection with operations and devices which are inherently dangerous or extremely critical in such use. It is not enough that most of the articles sent to the accept receptacle are good but it is of the utmost importance that all the articles sent to the accept recepacle meet the required specifications. If some of the good specimens are sent to the reject receptacle, it only means that those articles will have to be re-classified or that some good specimens will be wasted, but it would not, thereby, effect the operation of machines in which the specimen is to be used.

Referring to Figures 1 and 2, in one typical operation of my device, the specimen 3 is positioned in a test block 5 and if the specimen is good, tube 8 is in light and tube 7 is in shadow. The bias on the control grid 17 of the tube 18 is controlled by means of a slidable contactor 27, connected to the resistor 24 so that when the bridge is in balance, both phototubes 7 and 8 being in light or both being in shadow, substantially no current flows through the tube 18 and the energy translation means 28 is not actuated and the reject circuit 31 remains closed. Furthermore, if the tube 7 should be placed in light and the tube 8 in shadow, a still greater negative potential is placed upon the control grid 17 which further prevents tube 18 from conducting a current. Thus, it is readily seen that the only time the energy translation means 28 can be actuated is when tube 8 receives the full light from the light source and tube 7 is sharply placed in shadow.

The unbalancing of the bridge in the direction of positive potential in order to drive the bias on the control grid 17 in a positive direction causes current in tube 18 to change from substantially no current to substantially maximum current which provides the proper sensitivity and speed required in precision measurements. I have referred herein to dimensional measurements by which I mean sizing measurements of all kinds as well as determining shapes, angles, bevels, location of slots, openings, etc.

Referring again to Figures 1 and 2 the solenoid valves 9 and 10 may be respectively connected to the accept circuit 32 and reject circuit 31 in order to provide a means for selecting the specimen according to the predetermined desired inspection.

Referring to Figure 3, I have illustrated the use of the broad principle of my invention wherein it is desired to use two stage amplification which has particular use in some types of inspection, particularly in photoelectric inspections wherein instead of using mechanical reference points such as the V block 5 of Figure 1, the reference point is established photoelectrically.

In Figure 3, the position of the phototubes 7 and 8 in the bridge circuit 33 is reversed. Tube 7 which must be in shadow when the piece is good, is connected in the positive arm of the bridge and tube 8, the tube that must be in light when the specimen is good, is connected in the negative arm of the bridge otherwise, the bridge is connected in the same manner as of Figure 2. Likewise, the tube 18 is provided with its operating voltage and current in the same manner as that illustrated and described for Figure 2 with exception that means are provided for causing flow of maximum current flow through the tube 18 when the bridge is balanced or unbalanced to cause rejection of the article. This is accomplished by connecting the control grid 17 to point 34 between resistors 23 and 24 and by adjusting the slidable contactor 27 on the resistor 24 the bias on the tube 18 is maintained sufficiently positive for the tube to conduct its maximum current. In this case, the tube 18 is prevented from conducting only under one state of light and shadow for the tubes 7 and 8 and that is when tube 7 is in shadow and tube 8 is in light. Under these conditions the bias on tube 17 is driven in a negative direction which substantially stops the flow of current to the tube 18. After the bridge is balanced due to both tubes 7 and 8 being in light or both being in shadow, tube 18 conducts the maximum current, or if tube 7 is in light and tube 8 is in shadow, tube 7 being connected to the positive side of the bridge 33, the potential on the control grid 17 of tube 18 is driven further in a positive direction thereby not effecting the flow of current to the tube 18.

The anode circuit of tube 18 is connected to a direct current source of potential at point 19 to which line is also connected the load resistor 35. The second stage amplifier 36 is shown as a gas-filled arc discharge type of tube although other suitable types may be used. The cathode circuit of the tube 36 is connected between the dividing resistor 37 and 38 connected between ground 40 and the source of D. C. potential at 19. The control grid 41 of the tube 36 is connected to the end of the resistor 35 nearest the anode of tube 18, in order that when the maximum current flows through the tube 18, load resistor 35 places a sufficiently high negative potential on the tube 36 compared with the potential on the cathode circuit that the tube 36 conducting substantially no current and the energy translation means 28 is not actuated. When tube 18 is rendered non-conducting by the tube 7 being in shadow and tube in light, no current flows through tube 18 and the potential on the control grid 41 of the tube 36 is substantially that of the positive terminal 19 of the source of the direct current. Thus for the energy translation-means to be actuated when the piece is good, the bridge 33 is unbalanced in a negative direction of potential which prevents current from flowing through tube 18 and permits current to flow through tube 36.

If the tube 36 is a gas filled tube, it will continue to conduct after being activated when receiving its operating voltages and current from a direct current source of potential. In such a case, a circuit breaking switch such as the switch 47 should be placed in the anode circuit and either manually operated or mechanically operated, being synchronized with the inspection operation so as to deactivate the tube 36 after each inspection to prepare it for the next inspection. However, if the source of power 29 is an alternating current, this need not be done since when the current changes direction across the tube 36 the control grid 41, if at a potential sufficiently negative, will deactivate the tube. The particular manner for deactivating the tube between inspections is not essential to this invention and any of the well known conventional means may be used.

Thus, within the broad principles of my invention, there is only one state of light and shadow for the light sensitive devices connected in the bridge circuit 33 which will positively actuate the energy translation means 28. All other states of light and shadow of the light sensitive devices prevent the actuation of the energy translation means 28. In other words, the energy translation means 28 is only actuated when the bridge circuit 33 is unbalanced in a negative direction of potential. If it is unbalanced in a positive direction of potential or if it is in balance, the energy translation means 28 is prevented from being actuated.

A selecting circuit 42 is shown embodying the solenoid rejecting valve 10 and the solenoid accepting valve 9 which are connected to a source alternating current. The relay switch 30 is shown in the open position corresponding to the time when the energy translation means 28 is not energized, in order that the specimen will pass to the reject receptacle unless some positive action occurs to actuate switch 30 and complete the accept circuit. The realy coil 28 is actuated when the piece is good, actuating the solenoid valve 9 which accepts the article meeting the required specifications.

In order to prevent the continuous flow of air through the reject side of the V block 5, cam 43 is provided which only closes the circuit connected to the A. C. current operating the solenoid valves 9 and 10, when the specimen 3 is in proper test position and this is accomplished by correlating the cam 43 with means for feeding the specimens into test zone or into the V block 5.

In order to still further insure against bad pieces being mixed with good pieces, it is desirable in two stage amplification as shown in Figure 3 to provide a means for preventing the actuation of the energy translation means 28 if the tube 18 in the first stage of the amplification should burn out. If the tube 18 did burn out, the potential on the control grid 41 of the tube 36 would be driven in a positive direction which would cause current to flow through the amplifying tube 36 and the relay coil 28 would be actuated. To prevent this, I connect the heating element 44 of the tube 18, said element having its energy supplied by the A. C. transformer 45, in series with a relay coil 46. If the heating element is good, the relay coil 46 is energized which maintains the relay switch 47 in closed position thus maintaining the completion of the anode circuit of the tube 36, but if the heating element 44 should burn out, the relay switch 47 will open which breaks the anode circuit of the tube 36 thereby preventing the relay coil 28 from being actuated which will insure that under this faulty condition, no bad piece will be mixed with the good pieces.

Figure 4 illustrates the use of an indicator in the anode circuit of the tube 18 or of the tube 36 in place of the relay coil, said indicator being actuated only when the piece is good. This is useful wherein accurate precision measurements will be required by which the sorting can be done by an operator watching the indicator. In other words, any means for translating the energy supplied by the amplification into the results of the inspection may be used within the scope of my invention.

Figure 5 illustrates the preferred use of a plurality of phototubes in a bridge circuit when used in connection with making two or more inspections of the specimen and is particularly useful in making two or more inspections of the specimen and especially in making two or more dimensional inspections. In general, the bridge circuit 33 in Figure 5 is the same as the bridge circuit 33 illustrated in Figure 2.

Referring to Figure 6, the specimen 3 shown in V block 5 against the stop 52 is shown in testing position such that the tubes 48 and 51 measure the length of the specimen and tubes 49 and 50 measure the width or diameter of the specimen, in which case, for a near perfect or a perfect specimen, the tubes 48 and 49 are in light and the tubes 50 and 51 are in shadow. The phototubes may be arranged in an optical system such as that shown in Figure 1.

Referring again to Figure 5, I have arranged the tubes 48 and 49, which must be in light for an acceptable specimen, connected in series in the positive arm of the bridge. The tubes 50 and 51, which are in shadow for an acceptable specimen are connected in parallel in the negative side of the bridge. This arrangement is only used in connection with the illustration of Figure 2 where one stage amplification is employed. Thus, by this arrangement of the tubes, if either of the tubes 48 or 49 are in shadow due to an imperfect specimen, it opens the positive side of the bride and the bridge is unbalanced in a negative direction of potential thus preventing actuation of the energy translation means 28 or if the tubes 50 and 51 are both in shadow and either the tubes 48 and 49 were in shadow, the bridge would be in balance which would also prevent the actuation of the energy translation means 28.

On the other hand, by properly adjusting the bias on the tube 18 through the slidable contactor 27, if tubes 48 and 49 are in light and either of the tubes 50 are in light, the bridge is balanced which will indicate that the specimen is not acceptable. Thus, to avoid all balancing and offsetting effects in simultaneously making two or more inspections, I provide a means which will insure the acceptance of the article only if the proper tubes are placed in light and shadow. I would not accomplish the objects of my invention if I connected tubes 48 and 49 in parallel and tubes 50 and 51 in series or in any other combination other than the one I have shown in Figure 5.

Referring to Figure 5, if I employ a two stage amplification, I connect tubes 48 and 49 in series in the negative side of the bridge and the tubes 51 and 50 in the positive side of the bridge in order to correspond to the bridge circuit 33 illustrated in Figure 3.

Throughout the specification where I have referred to a positive potential on a control grid, I mean a potential which may be slightly negative with respect to the cathode depending on the operating characteristics of the tube, but in all cases, I mean at least a potential or bias sufficient to initiate conductance of the electronic tube or electronic circuit. Some tubes depending on their operating characteristics will begin to conduct when the bias is within about a minus five volts.

The above described and illustrations of the drawings are not intended to limit the scope of my invention which is only limited by the following claims.

I claim as my invention:

1. In a photoelectric sizing device for making precision dimensional inspections of articles a source of light, a condensing lens positioned to concentrate a beam of light in an inspection zone, light sensitive devices positioned about a magnifying mirror, at least one of said light sensitive devices positioned to be placed in shadow and at least one other of the light sensitive device positioned to be placed in light when the article being tested is of a proper size, a bridge circuit including said light sensitive devices having the light sensitive devices which are in light when the article is of the proper size placed in the positive arm of said bridge and having the light sensitive devices which are in shadow when the article is of the proper size placed in the negative arm of the bridge, means for maintaining the bridge in balance when all the light sensitive devices are in shadow or all in light, means for unbalancing the bridge when a portion of the light sensitive devices are in light and another portion are in shadow, a selecting means for accepting or rejecting the article, means operating to accept the article only when all of the light sensitive devices in the positive arm of said bridge are in light and all of the light sensitive devices in negative arm of said bridge are in shadow, means operating to reject the article when the bridge is in balance or when the bridge is unbalanced in any other manner than the state of unbalance required for accepting the article, and means for varying the tolerance within which the selecting means will accept the article including independent means for varying the maximum tolerance and the minimum tolerance by adjusting the position of the light sensitive devices about the magnifying mirror.

2. In a photoelectric sizing device for making precision dimensional inspections of articles a source of light; an inspection zone; means for directing a beam of light from said light source to said inspection zone; means for positioning the article to be tested in the inspection zone; a plurality of light sensitive devices positioned to receive light from said beam, at least one of said light sensitive devices positioned relative to said inspection zone and said light beam so as to be placed in shadow and at least one other of the light sensitive devices positioned relative to said inspection zone and said light beam so as to receive light from said beam when an article of proper size is in the inspection zone; a bridge circuit including said light sensitive devices having all the light sensitive devices which are in light when an article of proper size is in the inspection zone, in one arm of the bridge and having all of the light sensitive devices which are in shadow when an article of the proper size is in the inspection zone, in the other arm of the bridge; said bridge thereby being unbalanced in one direction of potential when an article of proper size is in the inspection zone; means responsive to said bridge for determining the acceptance of the article only when said bridge is so unbalanced and means for preventing the actuation of said acceptance determining means for all conditions of light and shadow on said light sensitive devices other than said conditions of light and shadow when an article of proper size is in the inspection zone.

3. In a photoelectric sizing device for making precision dimensional inspections of articles a source of light; an inspection zone; means for directing a beam of light from said light source to said inspection zone; means for positioning the article to be tested in the inspection zone; a plurality of light sensitive devices positioned to receive light from said beam, at least one of said light sensitive devices positioned relative to said inspection zone and said light beam so as to be placed in shadow and at least one other of the light sensitive devices positioned relative to said inspection zone and said light beam so as to receive light from said beam when an article of proper size is in the inspection zone; a bridge circuit including said light sensitive devices having all the light sensitive devices which are in light when an article of proper size is in the inspection zone, in one arm of the bridge and having all of the light sensitive devices which are in shadow when an article of the proper size is in the inspection zone, in the other arm of the bridge; said bridge thereby being unbalanced in one direction of potential when an article of proper size is in the inspection zone; means responsive to said bridge for determining the acceptance of the article only when said bridge is so unbalanced, means for preventing the actuation of said acceptance determining means for all conditions of light and shadow on said light sensitive devices other than said conditions of light and shadow when an article of proper size is in the inspection zone, and means for varying the tolerance within which the acceptance determining means is actuated including independent means for varying the maximum tolerance and the minimum tolerance by adjusting the position of the light sensitive devices relative to said inspection zone and said light beam.

4. In a photoelectric sizing device for making precision dimensional inspections of articles a source of light; an inspection zone; means for directing a beam of light from said light source to said inspection zone; means for positioning the article to be tested in the inspection zone; a plurality of light sensitive devices positioned to receive light from said beam, at least one of said light sensitive devices positioned relative to said inspection zone and said light beam so as to be placed in shadow and at least one other of the light sensitive devices positioned relative to said inspection zone and said light beam so as to receive light from said beam when an article of proper size is in the inspection zone; a bridge circuit including said light sensitive devices having all the light sensitive devices which are in light when an article of proper size is in the inspection zone, in the negative arm of the bridge and having all of the light sensitive devices which are in shadow when an article of the proper size is in the inspection zone, in the positive arm of the bridge; said bridge thereby being unbalanced in a negative direction of potential when an article of proper size is in the inspection zone; means responsive to said bridge for determining the acceptance of the article only when said bridge is so unbalanced and means for preventing the actuation of said acceptance determining means for all conditions of light and shadow on said light sensitive devices other than said conditions of light and shadow when an article of proper size is in the inspection zone.

5. In a photoelectric sizing device for making precision dimensional inspections of articles a source of light; an inspection zone; means for directing a beam of light from said light source to said inspection zone; means for positioning the article to be tested in the inspection zone; a plurality of light sensitive devices positioned to receive light from said beam, at least one of said light sensitive devices positioned relative to said inspection zone and said light beam so as to be placed in shadow and at least one other of the light sensitive devices positioned relative to said inspection zone and said light beam so as to receive light from said beam when an article of proper size is in the inspection zone; a bridge circuit including said light sensitive devices having all the light sensitive devices which are in light when an article of proper size is in the inspection zone, in the positive arm of the bridge and having all of the light sensitive devices which are in shadow when an article of the proper size is in the inspection zone, in the negative arm of the bridge; said bridge thereby being unbalanced in a positive direction of potential when an article of proper size is in the inspection zone; means responsive to said bridge for determining the acceptance of the article only when said bridge is so unbalanced and means for preventing the actuation of said acceptance determining means for all conditions of light and shadow on said light sensitive devices other than said conditions of light and shadow when an article of proper size is in the inspection zone.

SAMUEL C. HURLEY, Jr.

REFERENCES CITED

The following references are of record in the file of this patent:

UNITED STATES PATENTS

| Number | Name | Date |
| --- | --- | --- |
| 1,722,751 | Jones | July 30, 1929 |
| 1,922,188 | Zworykin | Aug. 15, 1933 |
| 2,033,645 | Parkhill | Mar. 10, 1936 |
| 2,065,758 | Shepard, Jr. | Dec. 29, 1936 |
| 2,085,671 | Powers | June 29, 1937 |
| 2,102,664 | Alexander | Dec. 21, 1937 |
| 2,114,867 | Wilson | Apr. 19, 1938 |
| 2,140,355 | Gulliksen | Dec. 13, 1938 |
| 2,171,362 | Gulliksen | Aug. 29, 1939 |
| 2,177,133 | Desch | Oct. 24, 1939 |
| 2,193,590 | Gulliksen | Mar. 12, 1940 |
| 2,298,466 | Cooley | Oct. 13, 1942 |
| 2,310,342 | Artzt | Feb. 9, 1943 |

OTHER REFERENCES

"Electron Tubes in Industry," by K. Henney, pages 395–397; published by McGraw-Hill Book Co., New York, 1937.